US010752470B2

(12) United States Patent
Pickersgill

(10) Patent No.: US 10,752,470 B2
(45) Date of Patent: Aug. 25, 2020

(54) QUICK RELEASE SHACKLE

(71) Applicant: DURHAM LIFTING LIMITED, Middlesbrough (GB)

(72) Inventor: Frank Pickersgill, Tollesby (GB)

(73) Assignee: Durham Lifting Limited, Middlesbrough (GB)

( * ) Notice: Subject to any disclaimer, the term of this patent is extended or adjusted under 35 U.S.C. 154(b) by 73 days.

(21) Appl. No.: 15/742,794

(22) PCT Filed: Jul. 6, 2016

(86) PCT No.: PCT/GB2016/052035
§ 371 (c)(1),
(2) Date: Jan. 8, 2018

(87) PCT Pub. No.: WO2017/006116
PCT Pub. Date: Jan. 12, 2017

(65) Prior Publication Data
US 2018/0201483 A1 Jul. 19, 2018
US 2020/0039797 A9 Feb. 6, 2020

(30) Foreign Application Priority Data
Jul. 6, 2015 (GB) .................................. 1511923.3

(51) Int. Cl.
*B66C 1/34* (2006.01)
*F16G 15/06* (2006.01)
(Continued)

(52) U.S. Cl.
CPC ................ *B66C 1/34* (2013.01); *B63B 21/60* (2013.01); *F16B 45/04* (2013.01); *F16G 15/06* (2013.01); *B63B 27/10* (2013.01)

(58) Field of Classification Search
CPC . B66C 1/34; B63B 21/60; B63B 27/10; F16B 45/04; F16B 45/025; F16G 15/06; F16G 15/04
(Continued)

(56) References Cited

U.S. PATENT DOCUMENTS 1,813,294 A * 7/1931 Hunt ......................... B66C 1/34
294/82.33
4,174,132 A * 11/1979 Crook, Jr. ................. B66C 1/34
294/82.3
(Continued)

FOREIGN PATENT DOCUMENTS

| AU | 2010212330 A1 * | 3/2011 | ............ B63B 21/00 |
| EP | 382991 A1 * | 8/1990 | |
| GB | 1463078 A * | 2/1977 | ............... B66C 1/34 |

*Primary Examiner* — Stephen A Vu
(74) *Attorney, Agent, or Firm* — Jackson Walker LLP

(57) ABSTRACT

A shackle comprises a shackle body and a shackle jaw, the shackle jaw connected to the shackle body by a pivot element about which the shackle jaw and shackle body may pivot relative to one another. The shackle further comprises an actuator element and an actuator and a locking element, the locking element arranged to engage the shackle body and the shackle jaw in a locking configuration and to disengage from the shackle jaw in a release configuration. The locking element is slidable along its longitudinal axis between the locking and release configurations and the actuator element is arranged to slide along its longitudinal axes. The pivot element, the actuator element and the locking element are connected to one another by a lever that is pivotally attached at one end to the shackle body and wherein the connection between the lever and the locking element and the actuator element permits pivotal movement and limited linear movement between the lever and the locking and actuator elements.

16 Claims, 3 Drawing Sheets

(51) Int. Cl.
  *F16B 45/04*    (2006.01)
  *B63B 21/60*    (2006.01)
  *B63B 27/10*    (2006.01)

(58) Field of Classification Search
  USPC .................. 294/82.3, 82.17, 82.23, 82.31
  See application file for complete search history.

(56) References Cited

U.S. PATENT DOCUMENTS

| | | | | |
|---|---|---|---|---|
| 4,389,907 | A * | 6/1983 | Epstein | B63B 21/60 |
| | | | | 114/252 |
| 5,178,427 | A * | 1/1993 | Jorritsma | B66C 1/38 |
| | | | | 294/82.3 |
| 6,375,242 | B1 * | 4/2002 | Zingerman | B66C 1/36 |
| | | | | 294/82.3 |
| 9,114,958 | B1 * | 8/2015 | DiSpazio | B66C 1/34 |
| 2005/0127695 | A1 * | 6/2005 | Cranston | B66C 1/34 |
| | | | | 294/82.3 |
| 2010/0187844 | A1 * | 7/2010 | Piinspanen | B66C 1/36 |
| | | | | 294/81.56 |

* cited by examiner

QUICK RELEASE SHACKLE

RELATED APPLICATIONS

This application is a national stage entry under 35 U.S.C. § 371 of PCT/GB2016/052035, entitled "Quick Release Shackle" and filed Jul. 6, 2016. The prior application is herein incorporated by reference in its entirety.

FIELD OF THE INVENTION

The present invention relates to shackles and in particular to shackles arranged for the release of a supported load.

BACKGROUND OF THE INVENTION

Shackles are used in many situations but the present invention is concerned with a shackle that is used to support a load.

In certain load carrying situations there can be a requirement to jettison a load quickly, for example where a load is supported from a crane that is itself mounted on a water borne vessel, sudden changes in wave conditions can result in a situation where the load must be jettisoned.

Shackles having pins that may be removed under load are known. Typically, an actuator in the form of a hydraulic ram is provided to pull the shackle pin out of its housing in the shackle. One problem with this type of arrangement is that the load is carried directly by the hydraulic ram.

It would be desirable to provide a quick release shackle which may be released when the shackle is under load.

SUMMARY OF THE INVENTION

According to the invention there is provided a shackle comprising a shackle body and a shackle jaw, wherein the shackle jaw is connected to the shackle body by a pivot element about which the shackle jaw and shackle body may pivot relative to one another, the shackle further comprising an actuator element and an actuator and a locking element, the locking element arranged to engage the shackle body and the shackle jaw in a locking configuration and to disengage from the shackle jaw in a release configuration, wherein the locking element is slidable along its longitudinal axis between the locking and release configurations and wherein the actuator element is arranged to slide along its longitudinal axes and wherein the pivot element, the actuator element and the locking element are connected to one another by a lever that is pivotally attached at one end to the shackle body and wherein the connection between the lever and the locking element and the actuator element permits pivotal movement and limited linear movement between the lever and the locking and actuator elements.

The pivot element may be a pin.

The actuator is preferably an hydraulic ram comprising a piston and cylinder and the actuator element is preferably the piston of the hydraulic ram.

The locking element may be a pin.

The shackle jaw may include a bore for receiving the locking element, which may be a locking pin. The bore may be a through bore. The bore may align with one or more bores in the shackle body.

Preferably, the connection between the lever and the locking element and the actuator element includes a pin extending through a slot. Preferably, the lever includes two slots of differing length.

It is preferred that the actuator is configured so that with the actuator element fully extended the locking element is in the release configuration. Advantageously, when the locking element is in the release position it is housed within a part of the shackle body.

The shackle may further include a a shackle loop. The shackle loop may be releasably attachable to the shackle body. The shackle loop may be attached to the shackle body by a pin.

BRIEF DESCRIPTION OF THE DRAWINGS

In the Drawings, which illustrate preferred embodiments of the quick release shackle invention.

DETAILED DESCRIPTION OF THE PREFERRED EMBODIMENTS

Figure 1:
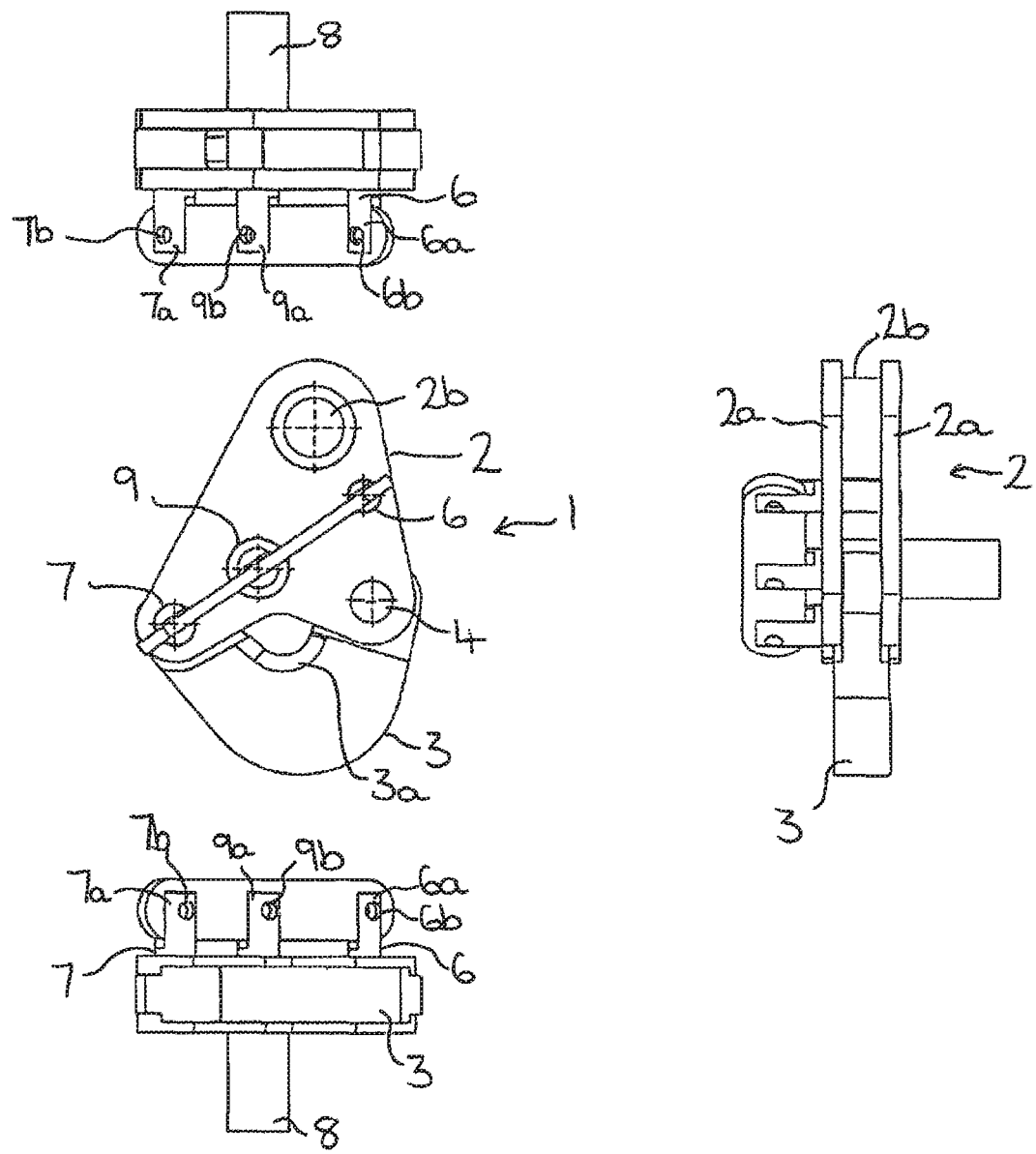
FIG. 1 illustrates side, top and bottom plan and end views of the quick release shackle of the invention.

A shackle 1 comprises a body 2 formed from two spaced apart plates 2a joined together by a through collar 2b. The shackle body 2 is connected to a rope or chain through the collar 2b.

A shackle jaw 3 is attached to the body 2 by a pin 4. The shackle jaw 3 may pivot on the pin 4.

A first pin 6 extends between and throughout the plates 2a.

A second pin 7 is releasably mounted in aligned apertures in the plates 2a. The shackle jaw 3 is provided with an aperture that aligns with the apertures in the plates 2a to fasten the shackle in the configuration shown in FIG. 1.

A third pin 9 extends through the plates 2a. The pin 9 is the piston of a hydraulic ram 8 which is attached to one side of the body 2.

Each of the first, second and third pins 6, 7, 9 have bifurcated end portions 6a, 7a, 9a. Each bifurcated end portions are provided with holes 6b, 7b and 9b respectively for receiving a pin.

A lever arm 10 sits between the bifurcated end portions 6a, 7a and 9a and is connects together the pins 6, 7 and 9. The lever arm 10 is illustrated in detail in FIG. 2.

The lever arm includes three apertures, 10a-10c, each of a different shape. The first aperture 10a is circular and is configured to receive a pin passing through the holes 6b in the bifurcated end portions 6a of the pin 6.

The second aperture 10b is in the form of a slot 10b and is configured to receive a pin passing though the holes 9b in the bifurcated end portions 9a of the pin 9.

The third aperture 10c is again in the form of a slot. However, the slot 10c is more elongate than the slot 10b. The slot 10c is configured to receive a pin passing through the holes 7b in the bifurcated end portions 7a of the pin 7.

The pin 9 of the hydraulic ram 8 reciprocates along a fixed path. The lever 10 is arranged to rotate about the pin extending through the holes 6b. As the pin 9 is extended, moving the lever 10 away from the shackle body 2, the distance between the holes 9b and the holes 6b increases. The function of the slots 10b is to accommodate this change in distance.

As the pin 9a extends as described above, the pin 7, which is held captive on the lever 10, is pulled out of the side plates 2a. The pin 7 travels in a straight line along its own longitudinal axis. Hence, the distance between the pin extending through the holes 6b of pin 6 and the holes 7b of pin 7 also increases as the pin 7 is moved further out of its seat in the plates 2a. The slot 10c is sufficiently elongate to accommodate this change in distance.

Figure 2:
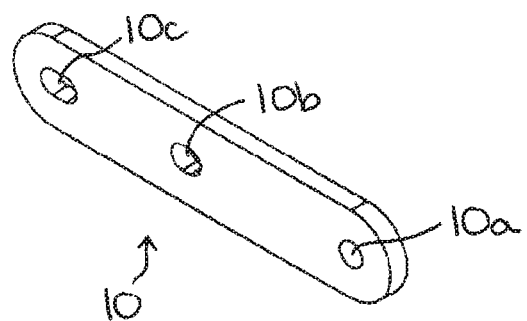
FIG. 2 is a schematic representation of a lever arm of the shackle illustrated in FIG. 1.

It will be appreciated from FIGS. 1 and 2 and the foregoing description that when the pin 9 is extended by sufficient a distance to allow the pin 7 to clear the inner face of the plate 2a proximate the lever 10 the shackle jaw 3 will pivot about the pin 4, thereby releasing any load supported by the shackle 1.

The hydraulic ram 8 and pin 9 are configured such that with the pin 9 fully extended, the surface of free end of the pin 7 lies in substantially the same plane as the inner face of the plate 2a that is proximate the lever 10. In this way, when the jaw 3 is released the pin 7 remains in a position where it may be drawn back through the shackle jaw 3 and the plate 2a which mounts the ram 8.

Additional attachment members for attaching together the plates 2a in the form of through collars or bushes may be provided and these may receive the pin 6 and the pin 9.

Figure 3:
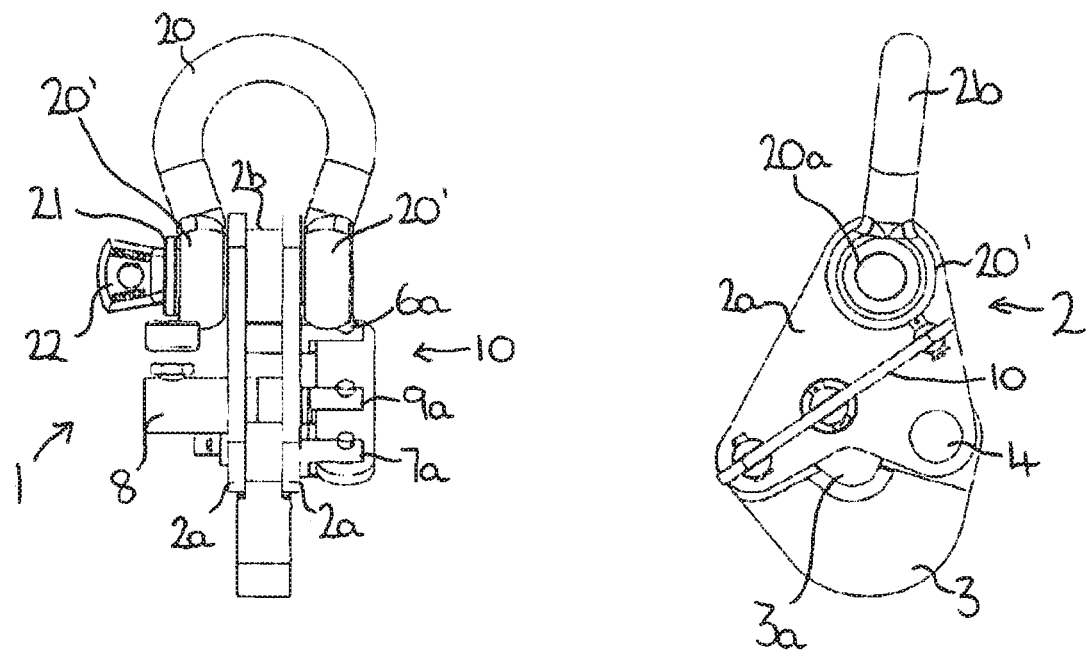
FIG. 3 is a front view of the shackle illustrated in FIG. 1 with a shackle link attached thereto, the shackle in a closed configuration.
Figure 4:
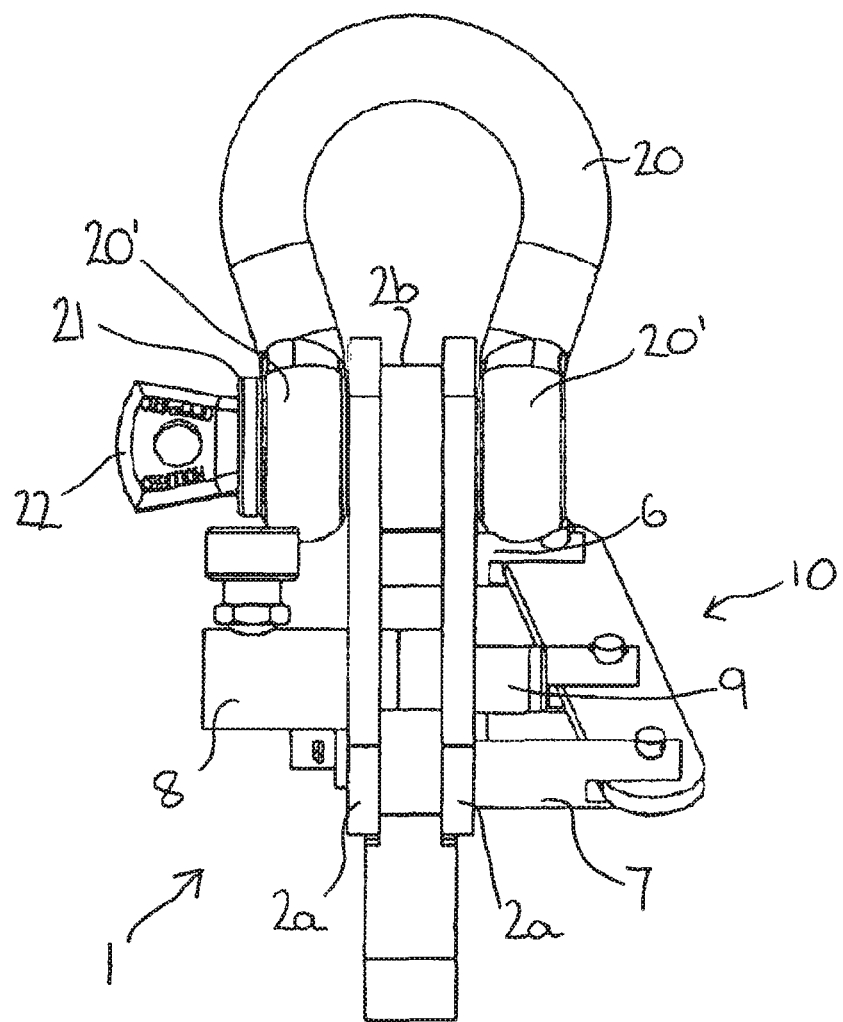
FIG. 4 is a front view of the shackle shown in FIG. 3 with the shackle in an open configuration.

FIGS. 3 and 4 show the shackle 1 with a shackle loop 20 attached to the shackle body 2. Attachment of the shackle loop 20 to the shackle body 2 is by means of a pin 21 which passes through a hole 20a in each of the ends 20' of the loop, and the collar 2b. The pin 21 has an end portion 22. The end portion 22 may be engaged to remove the pin 21 from the shackle loop 20 and shackle body 2 or insert the pin 21 into the aligned holes 20a of the shackle loop and through the shackle body 2.

FIG. 4 illustrates the shackle in the open configuration with the pin 7 withdrawn from the plates 2a, allowing the jaw 3 to rotate about the pin 4.

The drawings do not show a hydraulic pump. The hydraulic ram 8 requires a source of pressurised hydraulic fluid for its operation. The hydraulic pump may be a hand pump for example.

It will also be appreciated that a load supported by the shackle 1 in the shackle jaw 3 is in fact supported by the pins 4 and 7 only, not by the hydraulic ram 8 and its piston, the pin 9. This configuration allows a lighter weight actuator to be used. Also, removing the load from the actuator is likely to lead to lower rates of wear and tear. The pins 4 and 7 are much simpler and less costly to replace than a worn hydraulic cylinder.

The invention claimed is:

1. A shackle comprising a shackle body and a shackle jaw, wherein the shackle jaw is connected to the shackle body by a pivot element about which the shackle jaw and shackle body may pivot relative to one another, the shackle further comprising an actuator element and an actuator and a locking element, the locking element arranged to engage the shackle body and the shackle jaw in a locking configuration and to disengage from the shackle jaw in a release configuration, wherein the locking element is slidable along its longitudinal axis between the locking and release configurations and wherein the actuator element is arranged to slide along its longitudinal axes and wherein the pivot element, the actuator element and the locking element are connected to one another by a lever that is pivotally attached at one end to the shackle body and wherein the connection between the lever and the locking element and the actuator element permits pivotal movement and limited linear movement between the lever and the locking and actuator elements.

2. A shackle according to claim 1, wherein the pivot element is a pin.

3. A shackle according to claim 1 or 2, wherein the actuator is an hydraulic ram comprising a piston and cylinder.

4. A shackle according to claim 3, wherein the actuator element is the piston of the hydraulic ram.

5. A shackle according to any claim 1, wherein the locking element is a pin.

6. A shackle according to claim 1, wherein the shackle jaw includes a bore for receiving the locking element.

7. A shackle according to claim 1, wherein the locking element is a locking pin.

8. A shackle according to claim 6 or 7, wherein the bore is a through bore.

9. A shackle according to claim 6, wherein the bore is aligned with at least one bore in the shackle body.

10. A shackle according to claim 1, wherein the connection between the lever and the locking element and the actuator element includes a pin extending through a slot.

11. A shackle according to claim 10, wherein the lever includes two slots of differing length.

12. A shackle according to claim 1, wherein the actuator is configured so that with the actuator element fully extended the locking element is in the release configuration.

13. A shackle according to claim 12, wherein when the locking element is in the release position it is housed within a part of the shackle body.

14. A shackle according to claim 1, further including a shackle loop.

15. A shackle according to claim 14, wherein the shackle loop is releasably attachable to the shackle body.

16. A shackle according to claim 14 or 15, wherein the shackle loop is attached to the shackle body by a pin.

* * * * *